US007155949B2

(12) United States Patent
Hellgren

(10) Patent No.: US 7,155,949 B2
(45) Date of Patent: Jan. 2, 2007

(54) FLUID CELL PRESS WITH A GRIPPING ARRANGEMENT AND METHOD AND USE OF THE PRESS

(75) Inventor: Keijo Hellgren, Västerås (SE)

(73) Assignee: Avure Technologies AB, Vasteras (SE)

( * ) Notice: Subject to any disclaimer, the term of this patent is extended or adjusted under 35 U.S.C. 154(b) by 0 days.

(21) Appl. No.: 10/513,709

(22) PCT Filed: Feb. 17, 2003

(86) PCT No.: PCT/SE03/00256

§ 371 (c)(1),
(2), (4) Date: Jul. 12, 2005

(87) PCT Pub. No.: WO03/095186

PCT Pub. Date: Nov. 20, 2003

(65) Prior Publication Data

US 2006/0117826 A1 Jun. 8, 2006

Related U.S. Application Data

(60) Provisional application No. 60/380,327, filed on May 13, 2002.

(30) Foreign Application Priority Data

May 8, 2002 (SE) .................................. 0201430

(51) Int. Cl.
*B21D 22/12* (2006.01)
*B29C 17/04* (2006.01)

(52) U.S. Cl. .................... 72/63; 72/56; 72/60; 72/446; 72/455; 29/421.1; 100/278

(58) Field of Classification Search .................... 72/56, 72/60, 63, 446, 455; 29/421.1; 100/278
See application file for complete search history.

(56) References Cited

U.S. PATENT DOCUMENTS

| | | | | |
|---|---|---|---|---|
| 4,079,613 | A * | 3/1978 | Syvakari | 72/63 |
| 4,105,388 | A * | 8/1978 | Hellgren | 72/63 |
| 4,163,378 | A * | 8/1979 | Hellgren | 72/63 |
| 4,573,335 | A * | 3/1986 | Persson | 72/63 |
| 4,658,618 | A * | 4/1987 | Hellgren | 72/63 |
| 4,676,086 | A * | 6/1987 | Hellgren | 72/63 |
| 4,693,103 | A * | 9/1987 | Hellgren | 72/63 |
| 4,711,111 | A * | 12/1987 | Hellgren | 72/63 |
| 5,272,898 | A | 12/1993 | Dittlo et al. | 72/57 |
| 6,321,582 | B1 | 11/2001 | Cullinane et al. | 72/57 |
| 6,837,088 | B1 * | 1/2005 | Kleber et al. | 72/60 |

(Continued)

FOREIGN PATENT DOCUMENTS

| | | |
|---|---|---|
| FR | 2 462 262 | 2/1981 |

(Continued)

*Primary Examiner*—David B. Jones
(74) *Attorney, Agent, or Firm*—Harness, Dickey & Pierce, P.L.C.

(57) ABSTRACT

The present invention relates to a method in a press of pressure cell type comprising a forming tool and, separated therefrom, a diaphragm, which define a forming space in which a blank is inserted for forming thereof against the forming tool by pressing the diaphragm against the blank. A blank portion projecting from the forming space is gripped by means of at least one gripping device and the connection between the blank and the gripping device is shielded from the diaphragm at least when the diaphragm is pressed against the blank. The invention further relates to a press of pressure cell type and a tray device.

38 Claims, 6 Drawing Sheets

U.S. PATENT DOCUMENTS

| | | | | |
|---|---|---|---|---|
| 2004/0050263 | A1 | 3/2004 | Hellgren | 100/295 |
| 2004/0055480 | A1 | 3/2004 | Hellgren | 100/269.04 |

FOREIGN PATENT DOCUMENTS

| | | | |
|---|---|---|---|
| WO | WO 92/15411 | | 9/1992 |
| WO | WO 99/12730 | | 3/1999 |
| WO | WO 99/62652 | | 12/1999 |
| WO | WO 02/43888 | A1 | 6/2002 |

* cited by examiner

FLUID CELL PRESS WITH A GRIPPING ARRANGEMENT AND METHOD AND USE OF THE PRESS

FIELD OF THE INVENTION

The present invention relates to a press of pressure cell type and a method in such a press. The invention further relates to a tray device.

BACKGROUND ART

A press of pressure cell type generally comprises a force-absorbing press body defining a press chamber. In the upper part of the press chamber, a press plate and a diaphragm of rubber or another resilient material are arranged, which together form a pressure cell. The pressure cell communicates with a source of pressure and expands when a pressure medium is supplied. In the lower part of the press chamber, a structural support or a tray is usually arranged, which comprises a bottom plate having a tray frame. The tray supports a forming tool, a workpiece or blank to be machined, and, generally, a mat of rubber or another resilient material covering the forming tool and the blank.

Presses of pressure cell type are used, among other things, when forming sheet-shaped blanks or workpieces, for example sheets of steel or aluminium, to short-series products within the aerospace and automotive industries. The sheet is placed in the press in such manner that one of its sides faces a forming tool. The resilient diaphragm is arranged on the other side of the sheet. A closed space between the diaphragm and the press plate located above the diaphragm constitutes the pressure cell and this space is filled during the forming process with a pressure medium. By pumping additional pressure medium into the pressure cell, the pressure is increased in the pressure cell and the resilient diaphragm is pressed during stretching against the sheet which, in its turn, is formed round or in the forming tool. When the sheet completely fits to the forming tool, the pressure in the pressure cell is released and the diaphragm is removed, following which the formed component can be taken out of the press. It is often desirable to obtain an efficient handling of the production flow and, thus, short cycle times.

SUMMARY OF THE INVENTION

One object of the present invention is to provide more efficient operation of a press of pressure cell type.

Another object of the invention is to provide a simple method of operating a press of pressure cell type.

These and other objects, which will be evident from the following description, are achieved by means of a press of pressure cell type and a method, which have the features indicated in the appended claims.

According to one aspect of the invention, a method is provided in a press of pressure cell type comprising a forming tool and, separated therefrom, a diaphragm, which define a forming space in which a blank is inserted for forming thereof against the forming tool by pressing the diaphragm against the blank. According to the method, a blank portion projecting from the forming space is gripped by means of at least one gripping device, and the connection between the blank and the gripping device is shielded from the diaphragm at least when the diaphragm is pressed against the blank.

Thus, the present invention is based on the understanding that the operation of a press of pressure cell type can be rendered more effective compared with existing forming methods by using at least one further measure in the form of shielding the connection between the blank and the gripping device. Incorporating such an additional measure is contrary to the general approach according to which the elimination of measures is what makes the operation less time-consuming and more efficient. Surprisingly, however, it has been found that providing shielding according to the method of the invention may result in an overall saving of time. One reason for this is that, during repeated pressing operations, the diaphragm, even when protected from below by a mat, risks being damaged or worn progressively as it comes in contact with edges and penetrates into slots, thus requiring a time-consuming operation to replace the diaphragm to be carried out. By shielding the connection between the blank and the gripping device, the diaphragm cannot extend to said connection and, thus, does not risk being damaged. Moreover, as will be described below, shielding can be achieved essentially simultaneously with at least one other measure.

According to a further aspect of the present invention, a press of pressure cell type is provided. At least one gripping device is arranged to grip a blank portion projecting from the forming space, and shielding means are arranged to shield the connection between the blank and the gripping device from the diaphragm at least when the diaphragm is pressed against the blank. As will be described below, said shielding means can be effectively incorporated into the press.

In the present application, forming space means the space in which a blank is to be formed between the diaphragm and the forming tool. The connection between the sheet and the gripping device forms the border area in which the sheet enters the gripping device.

It may be appropriate, in particular when forming a sheet-metal blank, to stretch the blank beyond its yield point to obtain a plastic deformation thereof. This is achieved, for example, by arranging the blank between two gripping devices and stretching it by means of said devices before the diaphragm is allowed to press against the blank. Consequently, the blank has one connection to a gripping device and another connection, for example in a second end portion of the blank, to another gripping device. If the distance between these two connections is increased after the blank has been gripped, the blank will be stretched. It should be noted that to stretch the blank it is enough to displace one of the connections, for instance by causing one of the gripping devices to move. According to at least one embodiment of the invention, the stretching operation is carried out essentially simultaneously with the shielding. According to at least one further embodiment of the invention, the connection is shielded after stretching, but before the diaphragm is pressed against or enters into contact with the blank.

Shielding can be achieved, after the blank has been stretched, if applicable, for example by moving two shielding members, one on each side of the blank, towards each other and applying a compressive force to the shielding members in said direction. The compressive force has to be large enough to obtain a sufficiently tight abutment between the shielding members and the blank, i.e. a seal that will resist the pressure of the diaphragm and prevent the diaphragm from extending between the shielding members and the blank to said connection. The shielding members can be brought together even if it is desirable to stretch the blank, as long as they do not prevent the blank from being stretched. For example, they could abut against the blank without any compressive force having yet been applied thereon. Alternatively, the shielding members can be designed, as will be described below, in such manner that it is possible to stretch the blank even if the compressive force is applied.

It should be noted that unlike clamps, pinches or other forms of gripping devices, which are susceptible of receiving both a blank and a diaphragm, the variant of the shielding member described above may be influenced by an applied compressive force, which ensures that the gripping device receives the blank only. As will be shown, even the diaphragm itself may contribute to the application of said force. The compressive force is maintained until there is no longer any risk of the diaphragm penetrating in the connection between the blank and the gripping device.

A lower shielding member is conveniently arranged on the tray bottom, for example adjacent the forming tool, and the blank is then placed above said member and gripped by means of the gripping device and stretched, if applicable. An upper shielding member is lowered and, suitably, pressed against the lower shielding member and the intermediate blank. The compressive force is achieved, for example, by means of hydraulic pistons. In this case, the shielding members, or at least portions thereof, are preferably situated in front of the connection between the blank and the gripping device, i.e. between the connection and the forming tool.

The operation of bringing together the shielding members as described above can also be used in connection with the actual gripping of the blank, thus resulting in a more efficient and time-saving operation. By bringing together not only the shielding members, but simultaneously an upper part and a lower part of the gripping device, the blank can be fixed during this motion.

For instance, fixing can be achieved with the aid of force-exerting means, such as hydraulic pistons. A force is applied to at least one of the shielding members, on both sides of the horizontal extent of the blank and/or gripping device transversely to the stretching direction, said force being directed towards the other shielding member. These forces, which are thus-applied along the periphery of the shielding members, located outside the blank and/or the gripping device in the stretching plane, exert a pressure on the gripping device in such manner that the blank is fixed by said gripping device.

Preferably, the upper shielding member is bent in such manner that its central portion is located vertically lower than peripheral portions to which said forces are applied. When the forces are applied, the upper shielding member is straightened and an evenly distributed pressure will be exerted on the gripping device below.

Suitably, the two shielding members are sufficiently separated in front of the connection of the blank to allow the blank to be stretched, i.e. there is a gap between the front portions of the shielding members that are not in contact with the gripping device. During the actual pressing of the diaphragm, the press load will close the gap enough to prevent the diaphragm from penetrating through it. Preferably, the diaphragm itself is used in this operation by exerting a pressure, during its expansion, on the upper shielding member to reduce the gap.

The upper part of the gripping device is suitably connected to an upper shielding member, so that they are lowered together onto the blank once the blank has been arranged on the lower part of the gripping device. Similarly, the upper part of the gripping device can preferably be lifted together with the upper shielding member, thus allowing quick and easy release of a finished blank.

Preferably, the shielding members are designed in such manner that they, when brought together, enclose the gripping device from above and from below, thus creating a space for the gripping device. Suitably, the space is large enough to allow the gripping device to be moved so that a blank fixed therein can be stretched. The gripping device is suitably moved radially outwards from the forming space. Owing to this encapsulation, the moving parts of the gripping device are thus relatively well protected from other elements also during stretching and, in particular, when the compressive force is applied to the shielding members. Moreover, the encapsulation allows the gripping device to be moved without a gap or a space being formed in which a diaphragm could penetrate.

The upper and the lower shielding member preferably have displacement surfaces, such as sliding surfaces on which respectively the upper and the lower part of the gripping device are slidable. A displacement surface can be achieved in various ways, for example by means of plane surfaces, grooves, ball bearings, etc.

When the gripping device is displaced in the space formed by the shielding member, the upper and the lower part are preferably interconnected and, thus, simultaneously displaced. The interconnection can be achieved, for example, by one of the parts having a bead or boss which fits in a hollow or dent in the other part. If the upper and the lower part of the gripping device are interconnected in the assembled position, then only one of them has to be subjected to a moving force, for example in the form of an external pulling device.

Preferably, a fixed stop is provided in or at said formed space, so that the gripping device cannot be displaced any further than this stop. Such a fixed stop ensures satisfactory repeatability and thereby allows blanks to be equally stretched even if they are stretched at different moments.

According to at least one embodiment of the invention, the forming tool is arranged in a tray device provided in a press, which tray device can be divided into an upper and a lower tray part, the blank being gripped by the upper and the lower tray part being brought together. Suitably, the shielding members are also brought together in connection with such a movement of the tray parts. In this case, the upper shielding member is connected to the upper part of the tray device to allow them to be lifted and/or lowered together.

An upper tray part can comprise, for example, part of a tray side, such as a beam which can be lifted from the rest of the tray. Suitably, two different side beams are liftable, for instance one from either longitudinal side of a tray. The upper shielding member is then connected to these side beams and extends between them. If the short side forms an indivisible piece, or even an integrated portion of said remaining part of the tray, such a short side is provided with a through hole through which the gripping device is accessible to an external pulling device to allow the blank to be stretched.

Instead of lifting only side beams of the tray, a whole annular part of the tray may be liftable and lowerable. Consequently, according to at least one embodiment of the invention, the tray device comprises a tray plate and a tray frame, said tray frame being annularly divisible into at least one upper frame part and one lower frame part. Annularly divisible here means that the parts are annular in cross section, i.e. they have the shape of a closed path around a central hollow space. An annular shape can be, circular, elliptic, straight long sides to semi-circular short sides, etc. Suitably, the upper shielding member is connected to the upper frame part to allow them to be lifted and/or lowered together. Moreover, the blank is preferably clamped or gripped in a corresponding manner. When the upper frame part has been lifted, thus exposing the lower tray part on which the lower part of the gripping device is arranged, an outer portion of the blank is arranged thereon. Then, as the upper frame part is lowered together with the upper part of the gripping device connected thereto, the upper and the lower part of the gripping device will fix the blank between them. At the same time, the entire tray frame is reassembled by the frame parts having been brought together.

When the pressing operation has been completed, the upper and the lower tray part are preferably separated by displacing said parts in relation to one another along the common centre axis direction of the parts, so that a space is formed between them. For instance, an upper frame part is lifted from a lower frame part, so that a processed blank is accessible for removal thereof, and so that, after removal of the processed blank, a new blank can be arranged in the tray device. An alternative to a straight lifting motion can be a turning motion, or a motion similar to opening a hatch, more or less corresponding to the motion of a trouser press.

It will be apparent from the above that a divisible tray device allows rapid fitting of a new blank, and also rapid removal of a finished blank, while at the same time the actual gripping of the blank is achieved in a simple manner. In addition, the displacement of the shielding members can be used advantageously in combination with the divisible tray device.

An efficient process is obtained if the tray device is taken out of the press before it is separated into said parts. A second tray device, in which a blank has already been fitted, can be simultaneously inserted in the press to be formed therein. While said blank is being formed in the press, the finished blank is removed from the tray device that has been taken out and replaced by a new, unprocessed blank. The separated parts of the tray device located outside the press are then brought together so that the device is ready for a new pressing operation.

Although it may be preferred to separate the tray parts outside the press, said parts can alternatively be separated and/or brought together inside the press chamber.

In the tray disposed in presses of pressure cell type, filling elements or end pieces are sometimes provided, for example at the short sides of the tray. In addition, resilient supports that are parallel to the main axis of the press chamber can be arranged adjacent the long sides of the tray. These end pieces and supports are made of a resilient material, such as rubber, and are thus fitted next to the forming tool. The end pieces serve as a support for the forming tool. They also have a protective function, since they protect the tray frame and prolong its service life, which is advantageous in particular in the case of a tray frame that is divisible into at least one upper and one lower frame part, as described above.

Advantageously, end pieces can be used also in connection with the present invention by integrating the shielding members in an end piece. Thus, an end piece can be divisible into an upper and a lower part. While the lower part is intended to remain on the bottom of the tray, in conventional manner, the upper part can be lifted and act as the upper shielding member. The upper part of the gripping device is conveniently arranged in said upper end piece. As described above in connection with the shielding members, the upper and the lower part of the end piece preferably form a space in which the gripping device is movable.

Preferably, use is made of at least two divisible end pieces as described above, said end pieces being arranged at two opposite sides of the inner wall of the tray device and serving as a support for the forming tool. The blank is thus placed over the forming tool and clamped on either side by means of the end pieces and the gripping devices arranged therein. If a smaller forming tool is to be used, the dimension of which is smaller than the available space between the end pieces, one of the end pieces is suitably moved away from the inner wall towards the centre of the tray device to abut against and support the small forming tool.

In the case where use is made of a divisible tray device, as described above, an upper part of each end piece is suitably integrated with or at least connected to the upper tray part. As mentioned above, the upper tray part may consist of either two side beams or an annular upper frame part. When the upper tray part is lifted, so are the upper part of the end pieces and, conveniently, also the upper part of each gripping device.

In the variant involving end pieces, as in other variants, only one of the gripping devices, or the connection of the blank thereto, needs to be movable in order to allow the blank to be stretched. According to at least one preferred embodiment of the present invention, use is made of a hydraulic arrangement comprising a hydraulic piston and a coupling means connected thereto. The coupling means, which can consist of an arm or a plate, is further connected to at least one of the parts of the gripping device, such as the upper or the lower part. The hydraulic piston is adapted to actuate the coupling means and, thus, the gripping device for stretching the fixed blank. In the case where one fixed end piece and one movable end piece are used, the hydraulic arrangement is suitably adapted to actuate the gripping device in the fixed end piece.

It follows from the above that, according to a third aspect of the invention, a tray device is provided for use in a press of pressure cell type, which tray device defines a space adapted to receive a forming tool against which a blank is formable. The tray device is thus characterised by at least one gripping device, which is adapted to grip an end portion of the blank, and shielding members, which are guidable between an open position and a shielding position and which are adapted to at least partially enclose the gripping device in the shielding position.

The above description emphasizes the fact that the gripping device comprises two parts which can be separated and then brought together. However, other alternative embodiments are conceivable. For instance, the gripping device can be provided with a slot which extends from the periphery of the gripping device, for example towards its centre. If the gripping device is circular in cross-section, the slot may extend radially from the periphery towards the centre of the gripping device. The blank portion projecting from the forming space is thus gripped by inserting it through the slot. The slot may optionally be inwardly tapered.

The shield of a gripping device which is circular in cross-section and has a slot that extends inwards from the circumferential si:irface is preferably rotatable about its centre axis. Such a rotation causes a blank portion inserted in the slot to move and can be compared with an initial wrapping or winding of the blank around the gripping device. Consequently, the blank is stretched when the gripping device is rotated. Moreover, the gripping device can be at least partially enclosed by a wall in tight abutment against the gripping device, said wall having a suitable cross section, which means that after a certain degree of rotation the slot faces the wall and, as a result, the connection between the blank and the gripping device is shielded. In this case, the wall can be considered to make up at least part of a shielding member, and shielding of the connection between the blank and the gripping device is achieved essentially simultaneously with the stretching of the blank.

The present invention is particularly suitable for forming a sheet-shaped blank, such as sheet steel, into a relatively flat object or a large surface object. Objects of this-type are, for example, car roofs, hoods, parts of an aircraft wing.

DETAILED DESCRIPTION OF THE DRAWINGS

Figure 1:
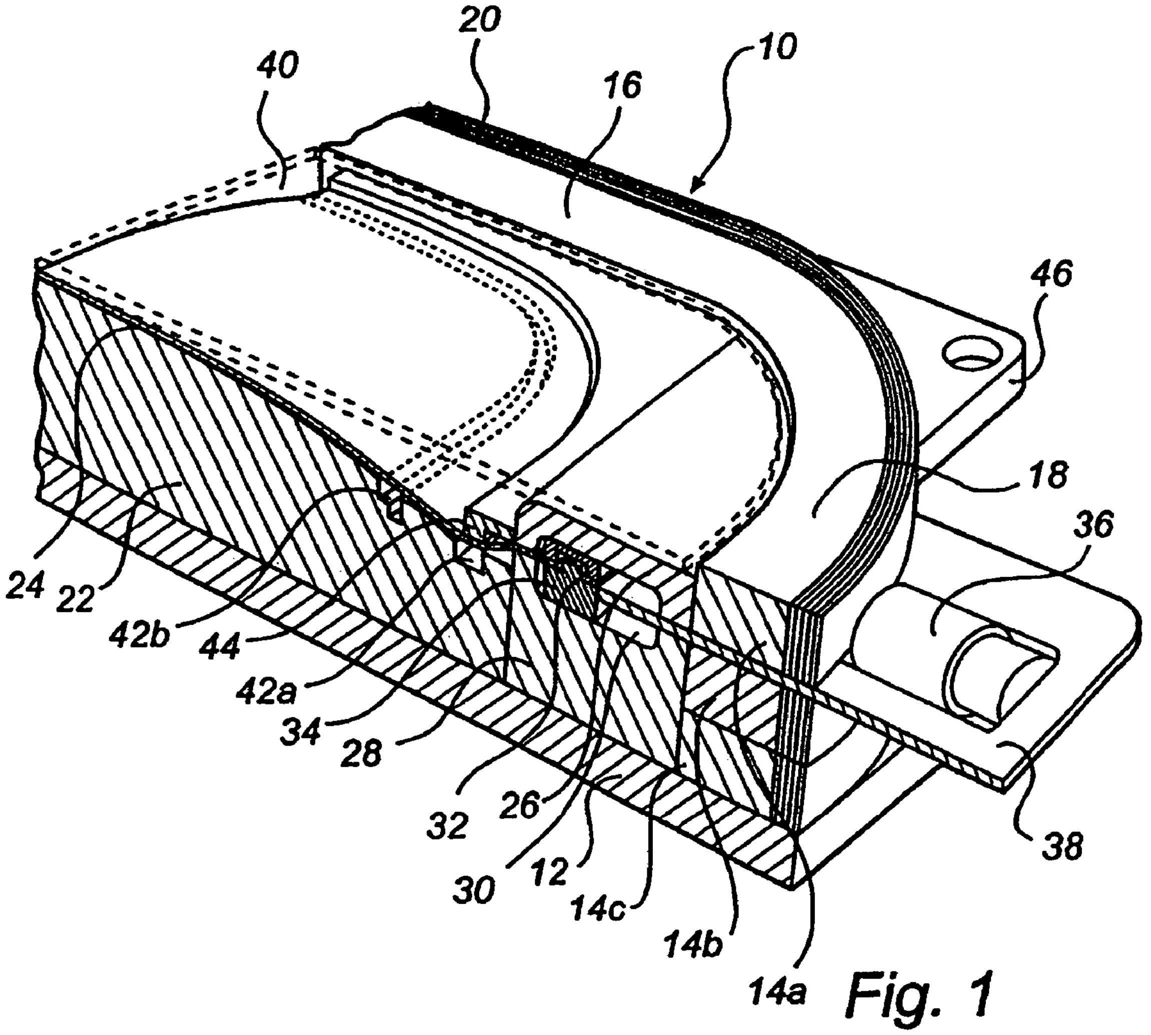
FIG. 1 is a cross-sectional perspective view of a portion of a tray device in a press of pressure cell type.

FIG. 1 is a cross-sectional perspective view of a tray device 10 in a press of pressure cell type. The tray device 10 comprises a bottom plate or tray plate 12 and a tray frame. The tray frame comprises three annular, plate-shaped lamellar means 14*a*, 14*b*, 14*c*, which are concentrically arranged one above the other. Each lamellar means has two parallel long sides 16 (part of one long side is shown), the section in the figure being taken along a line that is parallel to the long sides, and two rounded, semi-circular short sides 18 (part of one short side is shown), which together define an inner space. The external surface of each lamellar means 14*a*, 14*b*, 14*c* is provided with a prestressing, preferably band-shaped winding 20 adapted to absorb loads during pressing. Thus, this force-absorbing winding is not separate from the tray frame but integrated therewith.

In the space defined by the tray frame, a forming tool 22 is arranged on which a sheet 24 is to be formed. In the basic configuration, the lamellar means 14*a*, 14*b*, 14*c* are brought together in such manner that there is essentially no air gap between them. On the other hand, before a pressing operation, the sheet 24 is clamped between the uppermost lamellar means 14*a* and the lamellar means 14*b* located immediately below. The sheet 24 extends above the forming tool 22 across the defined space.

An end piece is arranged between the forming tool 22 and the inner wall on the short side 18 of the tray frame to support the forming tool. The end piece comprises an upper part 26, which is connected to the uppermost lamellar means 14*a*, and a lower part 28, which rests on the tray plate 12. When brought together, the upper 26 and the lower 28 part of the end piece form a sliding space 30 in which a locking or gripping device is displaceable. The gripping device comprises an upper part 32 and a lower part 34, between which the sheet 24 is clamped. The upper part 32 of the gripping device is connected to the upper part 26 of the end piece, while its lower part 34 abuts against the lower part 28 of the end piece. The gripping device is moved in the space by means of a hydraulic arrangement. The hydraulic arrangement comprises a hydraulic piston 36 which actuates a plate 38 connected to the gripping device. Accordingly, when the plate 38 is caused to move, the gripping device 32, 34 connected thereto will also move, which results in the fixed sheet 24 being stretched.

A protective mat 40, indicated by phantom lines, is arranged to cover the forming tool 22 and the sheet 24 and protects a diaphragm (not shown) to limit the wear thereof. The mat 40 rests on the upper side of the end pieces in the tray device. The diaphragm is located above the protective mat 40 and adapted to expand and press the sheet 24 located underneath against the forming tool 22. The surface of the forming tool is machined and provided with recesses having sharp edges, which act as cutting devices to cut or trim the sheet. Under low pressures, the area around the edge of the sheet is pressed against a first cutting device 42*a*. This is achieved by a punch 44 arranged above the cutting device 42*a* forcing the sheet 24 down towards the cutting device. The diaphragm, which is expanded during pressing, then presses the punch 44 against the sheet 24, which is pressed down into the first cutting device 42*a*, the outer edge of the sheet being cut off. When the pressure increases, a fine trimming takes place in a second cutting device 42*b*, which is a stepped recess. The sheet 24 is thus cut off at this cutting device 42*b*, following which the pressure is further increased to a maximum pressure, such as 1400 bar, and the sheet is thus given its final shape, for example that of a car roof.

FIG. 1 further shows that the upper part 26 of the end piece has a portion 46 which extends beyond the circumference of the lamellar means 14*a* to which the upper part 26 is connected. This projecting portion 46 has several functions. When this portion 46 is lifted, suitably together with the corresponding portion of the end piece (not shown) arranged at the other short side, the whole uppermost lamellar means 14*a* as well as upper parts 26 of the respective end pieces connected thereto, including the upper part 32 of the gripping device, are raised so that they are separated from the remaining elements located underneath. The projecting portion 46 is also used to shield the connection between the sheet 24 and the gripping device 32, 34 from the diaphragm. By applying a downward force to said projecting portion 46, for example by means of hydraulic pistons, the upper part of the end piece 26 will bear against the lower part 28, and the sheet 24 arranged between them, with enough force to prevent the diaphragm from penetrating between them. Alternatively, the downward force will contribute mainly to clamping the blank between the upper and lower part of the gripping device, while a gap between the upper 26 and lower 28 parts of the end piece will allow the sheet 24 to be stretched, the gap being closed only after stretching. The forces thus exerted are illustrated schematically in FIGS. 5*a* and 5*b*.

Figures 2, 3:
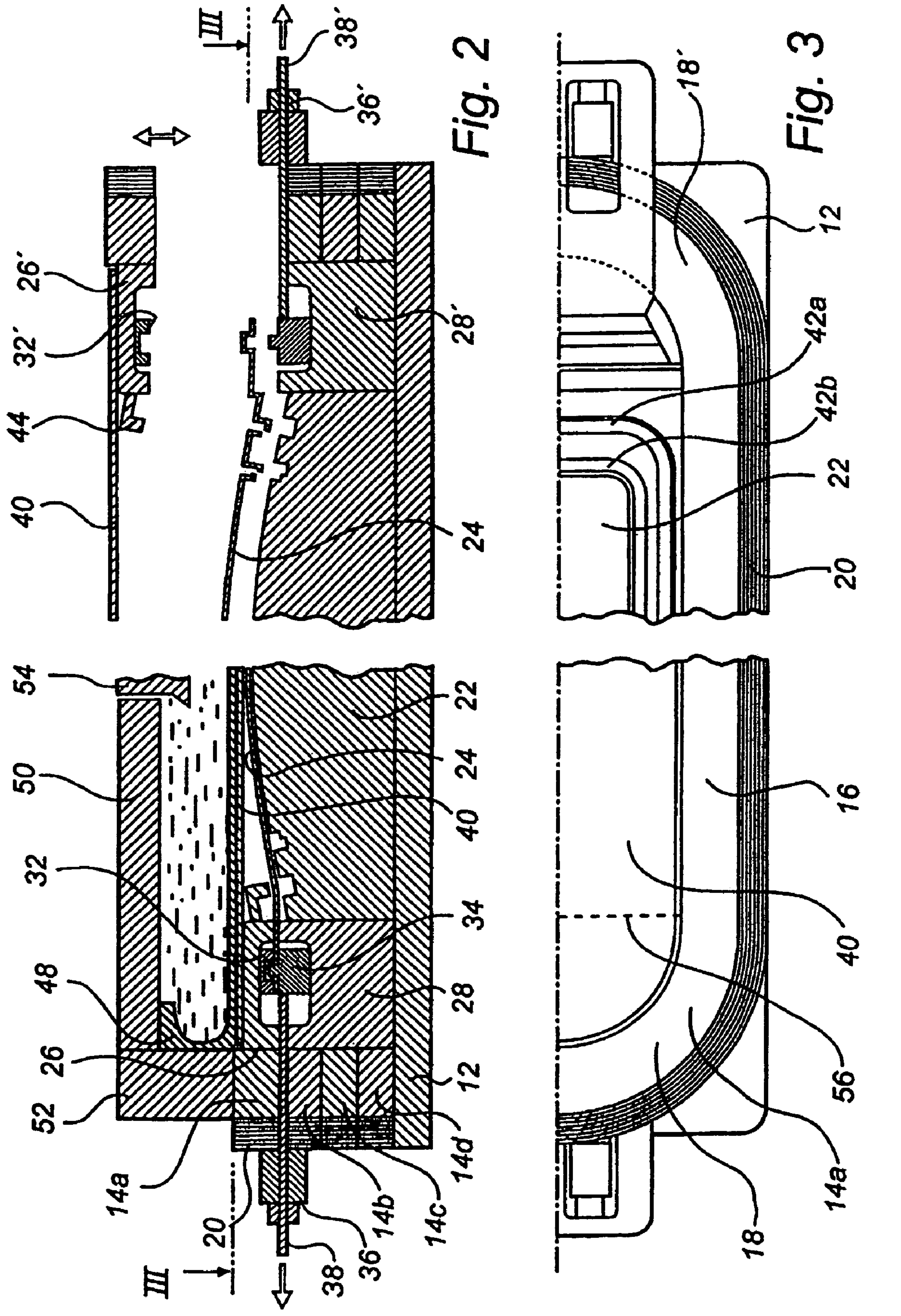
FIG. 2 is a cross-sectional side view of a portion of a press of pressure cell type with a tray device in two positions.
FIG. 3 is a cross-sectional top view of the portion of the press shown in FIG. 2.

FIG. 2 is a cross-sectional side view of a portion of a press of pressure cell type in two positions. The left part of the figure illustrates a position before the forming of a sheet, i.e. when the tray device is situated inside the press of pressure cell type, while the right part of the figure illustrates a position after the forming of the sheet, i.e. when the tray device has been removed from the press of pressure cell type. Similar reference characters are used to designate parts in FIG. 2 and FIGS. 3–5 which correspond to those in FIG. 1.

Thus, in the left part of FIG. 2 a tray device is shown comprising a tray plate 12 and a tray frame, which comprises four concentric lamellar means 14*a*, 14*b*, 14*c*, 14*d* arranged one above the other. Compared with FIG. 1, a further lamellar means 14*d* has thus been added. The number of lamellar means can be chosen depending on the desired working depth for the forming process concerned. As in the case of the tray device shown in FIG. 1, the lamellar means in the tray device according to FIG. 2 are wound with bands inside which an end piece having an upper part 26 and a lower part 28 is arranged. Moreover, an upper part 32 and a lower part 34 of a gripping device act to hold a sheet 24 projecting from the forming space, which is defined by a forming tool 22 resting on the tray bottom and a diaphragm 48 arranged above the latter. The diaphragm 48 forms, together with an upper press plate 50 and a vessel wall 52, a pressure cell, which can be filled with a liquid, such as water or oil, as indicated in the figure. The liquid is supplied through a valve 54. The edge zone of the diaphragm 48 is sealed so that no liquid can pass the diaphragm and force its way out of the pressure cell. When additional liquid is supplied to the pressure cell it will expand by the diaphragm 48 expanding downwards and pressing the sheet 24 against the forming tool 22. In the same way as described with reference to FIG. 1, shielding of the diaphragm is achieved, preferably before the diaphragm 48 has started its downward expansion, by the upper part 26 of each end piece being pressed against the lower part 28. Moreover, a protective mat 40 is arranged between the sheet 24 and the diaphragm 48, said mat 40 resting on the upper side of the end pieces.

It should be noted that the tray frame, i.e. the lamellar means 14*a*, 14*b*, 14*c*, 14*d*, as shown in FIG. 2, extends beyond the vessel wall 52 and, thus, has no force-absorbing means on the short sides (the section in the figure is taken along a line that is parallel to the long sides of the tray device). The prestressing provided by the wound bands 20 in combination with the rounded shape of the short sides is enough to withstand the internal forces generated during a pressing operation.

The right part of FIG. 2 illustrates a situation after the sheet 24 has been formed. The tray device has been laterally displaced and removed through an end piece of the press of pressure cell type. Outside the press of pressure cell type, the formed sheet has been made accessible by lifting the uppermost lamellar means 14*a*, and thus also the upper part of the end piece 26' with the protective mat 40 resting thereon as well as the associated punch 44 and upper part 32' of the gripping device. One advantage of the annular divisibility of the tray frame is that the protective mat 40 is rapidly and easily removed from the sheet. In prior art, use has been made, for instance, of more complicated devices by means of which the mat is rolled up only to be rolled out later before the next forming operation.

In the tray device shown in FIG. 2, the gripping devices on both short sides are connected to a hydraulic arrangement 36, 36', 36, 38', which allows the sheet to be stretched by pulling on one or both sides thereof.

FIG. 3 is a cross-sectional top view of the portion of the press shown in FIG. 2. The section is taken along the line III—III in FIG. 2. The left part of FIG. 3 shows how the protective mat 40 covers the whole sheet and the forming tool 22. Furthermore, the extension of the end piece is indicated by a dashed line 56. The end piece thus has the shape of a half moon or a filled semicircle, its rounded portion following the inside of the rounded portion of the tray frame, i.e. the short side 18. Together with the long sides 16 of the tray frame, the straight portion of said end piece, like that of the end piece provided at the other short side 18' of the tray device, forms a rectangular space in which the forming tool 22 is disposed. In the right part of FIG. 3, the surface irregularities of the forming tool are shown in the form of recesses, i.e. the cutting devices 42*a*, 42*b* mentioned above. FIG. 3 further shows that the bottom or tray plate 12 on which the lamellar means are arranged is essentially quadrangular and that its length and width correspond essentially to the length and width of the lamellar means (only the uppermost lamellar means 14*a* is shown in the figure). The lamellar means are shaped like a race track, i.e. two long sides 16 (only one is shown) and two short sides 18, 18' in the form of convex semicircles. The lamellar means are wound with bands, the thickness of the layer of bands 20 being about 100 mm.

Figure 4:
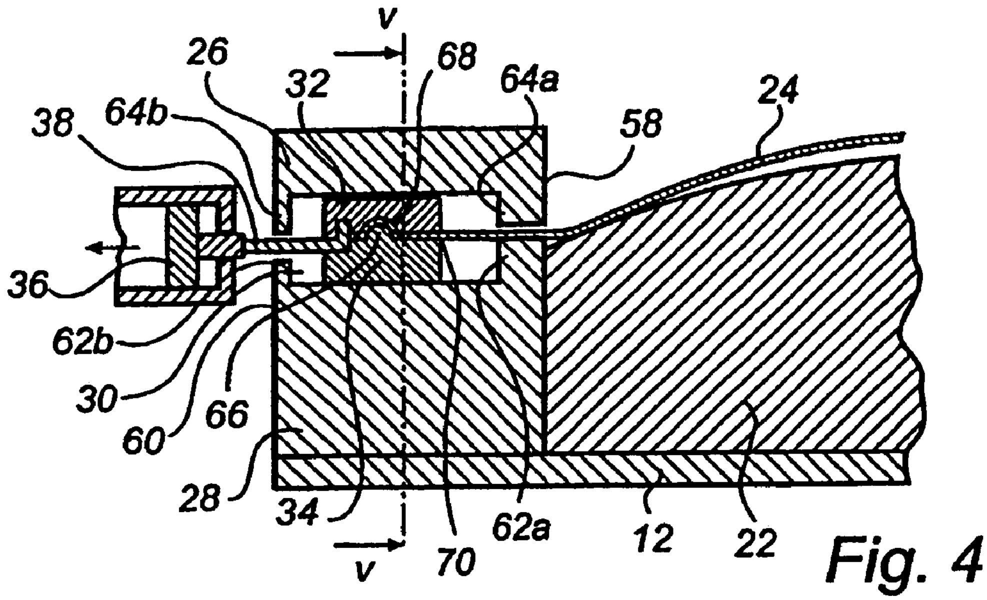
FIG. 4 is a schematic illustration of one example of stretching of a clamped sheet-metal blank.

FIG. 4 illustrates schematically one example of stretching of a clamped sheet-metal blank. The figure shows a forming tool 22 and an end piece 26, 28 resting on a tray plate 12. The tray frame is not shown. The end piece comprises a lower part 28, which is considerably larger than an upper part 26 or a cap. The end piece has one side which faces the forming tool 22, here called inside 58, and an opposite side, here called outside 60. The lower part 28 and the upper part 26 of the end piece have upwardly and downwardly projecting portions 62*a*, 62*b*, 64*a*, 64*b* both on the inside 58 and the outside 60 of the end piece. The projecting portions 62*a*, 64*a* on the inside 58 are thicker than the portions 62*b*, 64*b* on the outside 60, because the inside 58 is expected to be exposed to greater forces. Owing to these projecting portions, a sliding space 30 is formed when the parts 26, 28 of the end piece are brought together. A gripping device 32, 34 is slidingly arranged in said sliding space 30.

A sheet 24 to be formed against the forming tool is arranged in such manner that it also extends through a gap between the projecting portions 62*a*, 64*a* on the inside 58 of the end piece and penetrates between an upper 32 and a lower 34 part of the gripping device. The gap between the projecting portions 62*a*, 64*a* on the inside 58 of the end piece may typically be as small as about 0.10–0.15 mm, which basically prevents a diaphragm from penetrating through the gap while allowing a thin sheet-metal blank 24 to be stretched. The lower part 34 of the gripping device has a bulge or boss 66 which fits in a hollow 68 or dent in the upper part 32. In the joined position shown, the boss 66 and the hollow 68 form a connection, which allows the parts 32, 34 of the gripping device to be moved simultaneously even if only one of the parts is directly actuated by a moving force, such as an external pulling device. An external pulling device preferably comprises an arm or plate which, in this case, is connected to the gripping device. A pull ram 36 is connected to the plate 38 with the aid of which it can actuate the gripping device 32, 34 causing it to move, thereby allowing the clamped sheet 24 to be stretched beyond its yield point. In this phase, the upper 26 and the lower 28 part of the end pieces are not tightly compressed, but allow the sheet 24 to be stretched. It is not until after this that they are supposed to abut sealingly against the sheet so that its connection 70 to the gripping device, i.e. the side facing the forming tool 22, is shielded from the diaphragm when the latter is being used for forming the sheet 24. Examples of a gripping device and a pulling device will be described in more detail below with reference to FIGS. 9*a*–9*b* and FIG. 10.

Figure 5A:
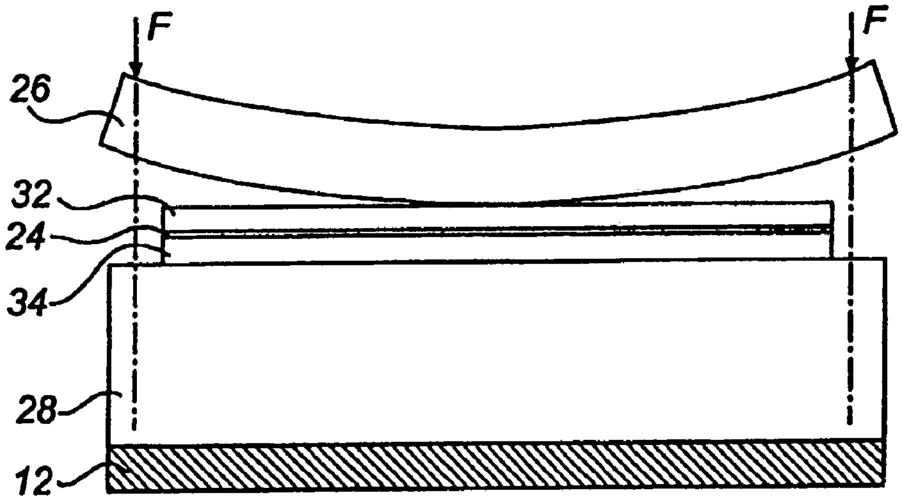
FIGS. 5*a* and 5*b* illustrate a method of shielding the connection between a blank and a gripping device.
Figure 5B:
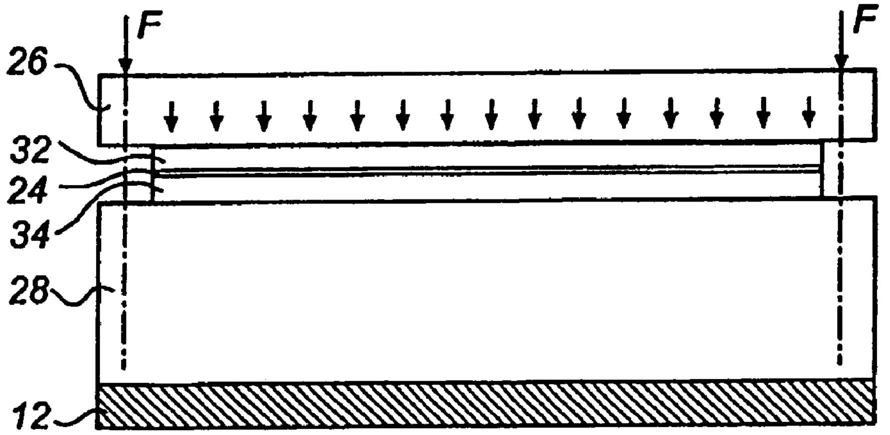

In general, it may be difficult to provide a uniform blocking of the sheet, which is desirable, in particular if the sheet is wide. However, a method will be described below according to which an even distribution of the pressure over the whole clamping area is obtained in a simple manner. FIGS. 5*a* and 5*b* illustrate a method of providing shielding of the connection between a sheet-metal blank and a gripping device as well as how to provide fixing of the sheet in a suitable manner. FIG. 5*a* is a cross-sectional view along the line V—V in FIG. 4. After the sheet 24 has been disposed on the lower part 34 of the gripping device, and after the upper part 32 of the gripping device and the upper part 26 of the end piece have been arranged on top of that, peripheral downward forces F are applied to the upper part 26 of the end piece. The upper part 26 of the end piece has the shape of a bow, i.e. it is slightly bent. Its central portion is located about 6 mm below it outer edges. Owing to this design, when a force is applied to the upper part 26 of the end piece outside the extension of the sheet, it is possible to obtain an even distribution of the pressure exerted on the upper part 32 of the gripping device, the sheet 24 thus being blocked by an even pressure over the whole blocking area.

The two forces, indicated by arrows F, typically exert-a load of 20 tons (about 200 kN) each, i.e. a total of 40 tons (about 400 kN) distributed over a typical width of 1.6 m, as illustrated in FIG. 5*b*. The upper part 26 of the end piece has a thickness of about 100 mm, a weight of about 500 kg, and a dimension in the stretching direction of about 0.5 m, and it is made of a steel material which is rigid enough to provide the effect described above. In addition to the advantage of allowing an even compression of the sheet, this peripheral application of forces also has the advantage of allowing forming of a wide sheet.

Following the application of the forces F, which blocks the sheet, the stretching operation is carried out. This is possible because the projecting portions 62*a*, 64*a* (see FIG. 4) on the inside 58 of the end piece are so dimensioned that after compression there is still a gap between them which allows the sheet 24 to be stretched. The gap can be small enough to provide a shield against the diaphragm. However, the projecting portion 64*a* of the upper part 26 of the end piece will usually be deflected during the actual forming of the blank, since loads amounting to, for example, 1000 bar will act on this portion. Thus, when the diaphragm starts to expand it may press down the upper part 26 of the end piece causing it to abut in a completely sealing manner against the sheet 24.

Figure 6A:
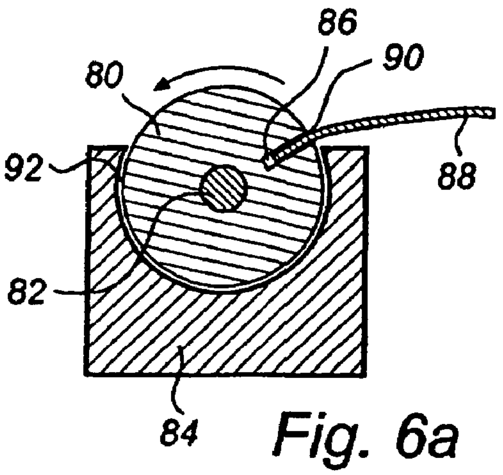
FIGS. 6*a* and 6*b* illustrate alternative methods for shielding and gripping arrangements.
Figure 6B:
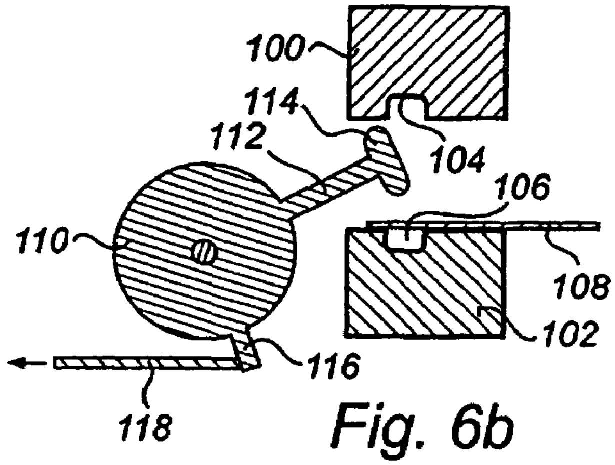

FIGS. 6*a* and 6*b* illustrate alternative methods for shielding and gripping arrangements. FIG. 6 is a cross-sectional view of a cylindrical gripping device 80. As shown, the gripping device 80 is circular in cross-section and has a central axis of rotation 82 about which it is rotatable. The gripping device 80 is disposed in a seat 84 with a semi-circular recess which essentially corresponds to the shape of the gripping device. The gripping device has a slot 86 or a groove which extends radially inwards from the circumference. In the slot 86, which may be tapered, an end portion of a sheet 88 is insertable to be fixed therein. The connection 90, i.e. the slot opening, between the sheet and the gripping device 80 is shielded from the diaphragm of the press of pressure cell type by the gripping device 80 being rotated so that the slot 86 and said connection 90 are oriented towards the inner wall 92 of the seat 84. In this way, the shielding operation is carried out essentially simultaneously with the sheet-stretching operation.

FIG. 6*b* shows an upper part 100 and a lower part 102 of a gripping device, each provided with a recess 104 and 106, respectively. A sheet 108 projecting from a forming space is disposed on the lower part 102 so that it covers the recess 106 therein. A rotatable cylinder 110 is provided with a radially projecting arm 112 the shape of whose end 114 is complementary to the recesses. The cylinder 110 is further provided with a radially extending protrusion 116, which in turn is articulated to a pulling plate 118. When the pulling plate 118 is pulled in the direction of the arrow, the protrusion 116 is actuated causing the cylinder 110 to rotate. This, in turn, causes the arm 112 to be lowered and the end 114 of the arm, together with the recess 106 in the lower part 102 of the gripping device, to fix the sheet 108. The upper part 100 of the gripping device is then lowered, its recess 104 being fitted to the end 114 of the arm, thereby interconnecting the lower part 102 and the upper part 100. The pulling plate 118, or any optional pulling means, such as a ram, can then pull the gripping device to stretch the sheet 108. This gripping device is conveniently used in combination with a shielding means similar to the end pieces described in connection with the previous figures.

Figure 7A:
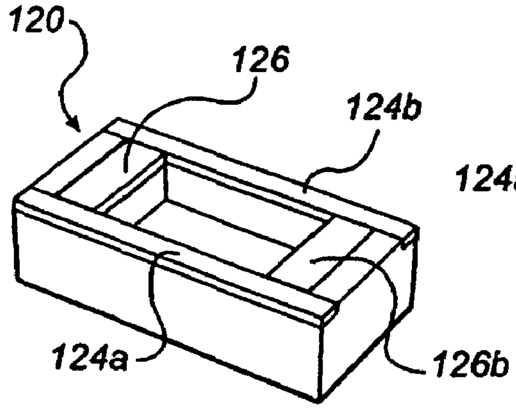
FIGS. 7*a* and 7*b* illustrate the handling of an alternative tray device.
Figure 7B:
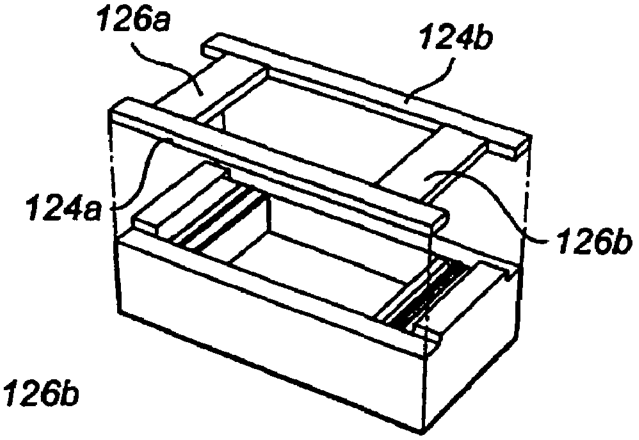

FIGS. 7*a* and 7*b* illustrate the method of handling an alternative tray device 120. The tray device 120 shown in perspective in FIG. 7*a* is forged and, thus, not made of hot-rolled sheet as the lamellar means shown in the previous figures. Accordingly, the tray device 120 is not annularly divisible. However, the long sides are such that two beam-shaped portions 124*a*, 124*b*, one on each long side, are liftable from the rest of the tray. Suitably, an upper part 126*a*, 126*b* of each shielding member or end piece is connected to said beam-shaped portions. Thus, when the two beam-shaped portions 124*a*, 124*b* are lifted, the upper part 126*a*, 126*b* of each end piece will be lifted too, as illustrated in FIG. 7*b*.

Figure 8:
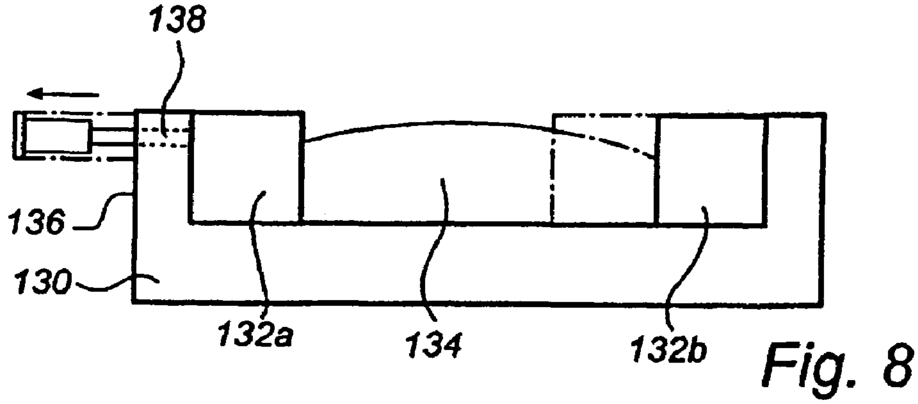
FIG. 8 illustrates possible ways of changing the dimensions of a tray device.

FIG. 8 illustrates only schematically the possibilities of changing the dimensions of a tray device 130. Two end pieces 132*a*, 132*b* are arranged on the tray bottom on either side of a forming tool 134. If a smaller forming tool is to be used, one end piece 132*b* can be moved inwards to a more central position in the tray device, as indicated by the phantom lines. The end piece 132*b* is fixed in the new position in a suitable manner, for example by means of engaging means from the tray bottom or additional filling elements between the end piece and the inner wall of the tray device.

The possibility of movement thus allows forming tools of different sizes to be used without the risk of the diaphragm penetrating in a space between the forming tool and the end piece, which could lead to unnecessary wear of the diaphragm against the edges of these elements.

Although FIG. 8 illustrates a forged tray device, the possibility of movement and the change of dimension can also be applied in connection with other types of tray devices, such as more divisible tray devices having, for example, lamellar means. In the case of a forged tray device 130, in which the short sides are usually formed in one piece with the tray bottom, one short side 136 is suitably provided with a through passage 138. The passage 138 is formed relatively high up on the short side 136 where the stress concentration of the tray device 130 is relatively low. A pulling device extends through the passage, said device being capable of pulling a gripping device provided in the end piece 132*a* and the sheet fixed therein.

Figure 9A:
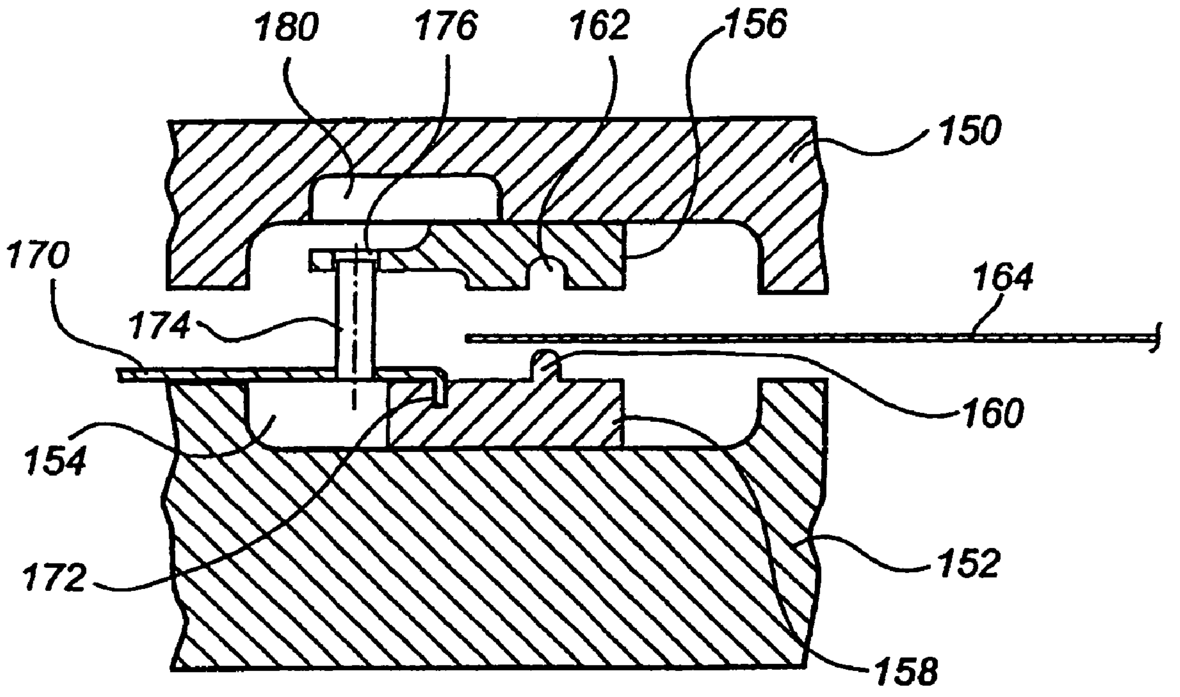
FIGS. 9*a* and 9*b* are cross-sectional views of a gripping and shielding arrangement according to one embodiment of the present invention.
Figure 9B:
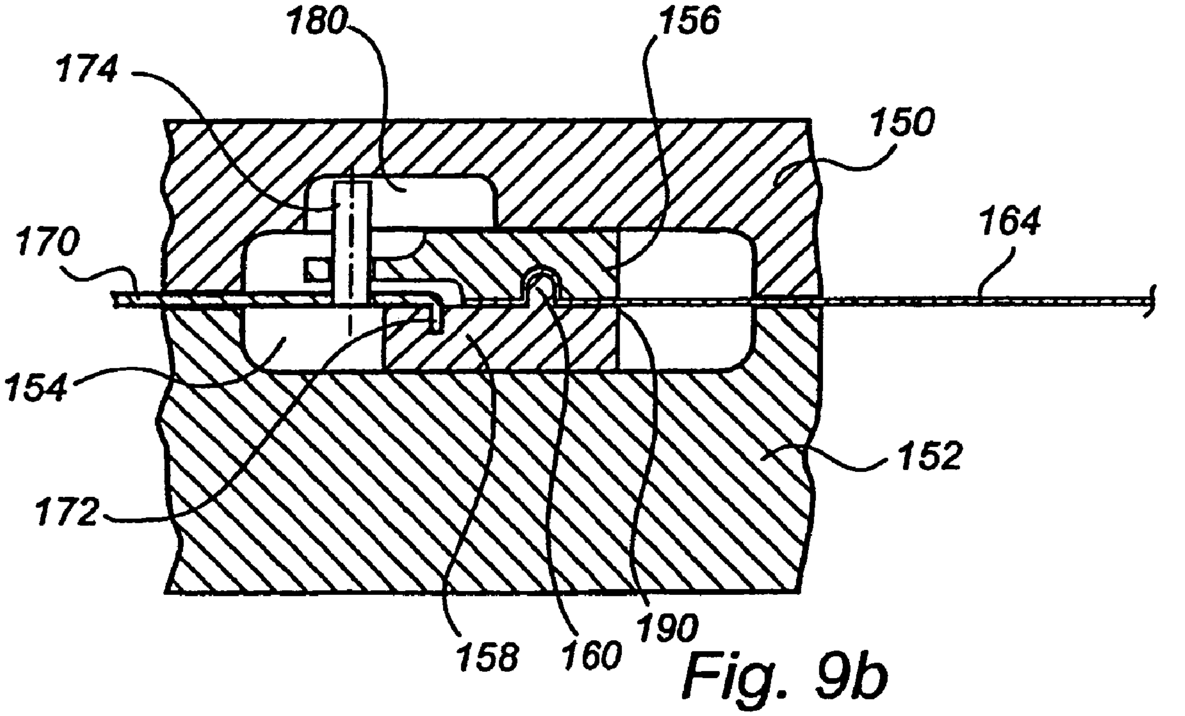
Figure 10:
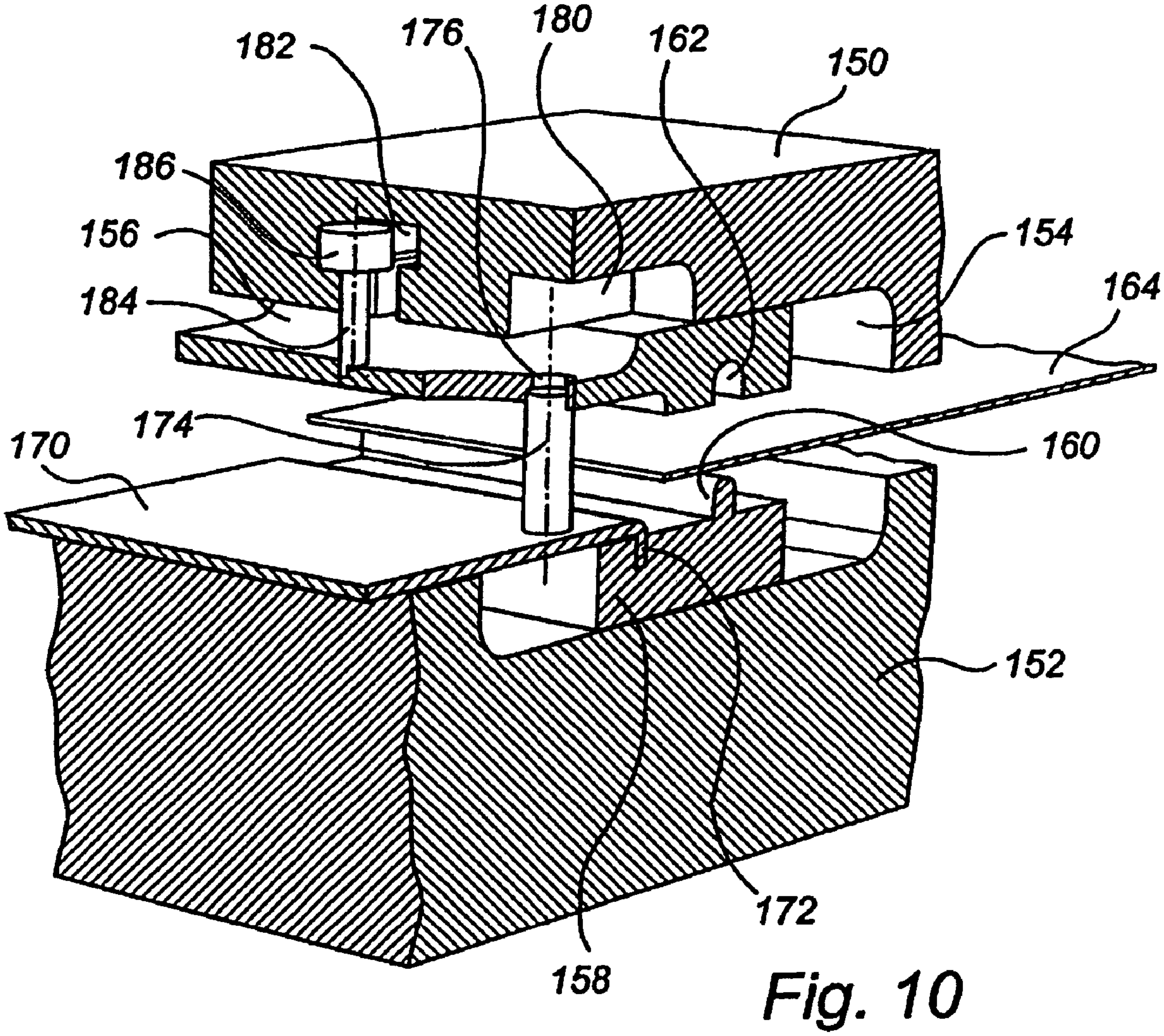
FIG. 10 is a perspective view of the arrangement in FIG. 9*a*.

FIGS. 9*a* and 9*b* are cross-sectional views of a gripping and shielding arrangement according to one embodiment of the present invention. FIG. 10 is a cut-out perspective view of the arrangement in FIG. 9*a*.

With reference to FIG. 9*a*, a lower shielding member 150 and an upper shielding member 152 (e.g. parts of an end piece) are shown, which together form a sliding space 154 in which a gripping device comprising and upper part 156 and a lower part 158 is slidingly arranged. The upper part

156 of the griping device is connected to the upper shielding member 150, whereas its lower part 158 bears against the lower shielding member 152. The lower part 158 of the gripping device comprises a boss 160 the shape of which fits in a recess 162 in the upper part 156. The upper part 156 and the lower part 158 are adapted to grip and fix a blank 164, such as a sheet, which is to be formed in an adjacent forming space. The lower part 158 of the gripping device has a groove, in which the vertical protrusion 172 of a horizontal plate 170 is inserted. Thus, when the plate 170 is subjected to a pulling force, the lower part 158 of the gripping device will also be pulled along. When the gripping device is in a joined position, as shown for instance in FIG. 9*b*, it will be possible for the whole gripping device 156, 158 to be pulled along when the plate 170 is moved, for example by means of a hydraulic cylinder.

In addition, an upwardly directed guide pin 174 is fixed to the plate. The diameter of the guide pin 174 is adapted to the diameter of a hole 176 through the upper part 156 of the gripping device. Thus, the upper part 156 of the gripping device is movable along the guide pin 174 by said pin being inserted in the hole 176. The guide pin 174 ensures that the upper part 156 and lower part 158 of the gripping device are correctly aligned relative to one another when brought together. In the position of separation of the gripping device and the shielding members, as shown in FIG. 9*a*, the upper part 156 of the gripping device encloses the top portion of the guide pin 174. This distance of separation or space is sufficient to allow a formed blank 164 to be removed and a new one to be inserted in the arrangement. The height of the space essentially corresponds to the vertical extension of a processed, i.e. finished, blank, such as a sheet or any other workpiece. In the joined position, as shown in FIG. 9*b*, the upper part 156 of the gripping device encloses the guide pin 174 slightly further down. In the joined position, space is provided for the guide pin 174 by a hollow space 180 being provided in the upper shielding member 150. The guide pin 174 can be moved horizontally in said hollow space 180 when the gripping device 156, 158 is pulled to stretch the blank 164. As shown, the guide pin 174, together with the horizontal plate 170 and its vertical protrusion 172, further has a supplementary connecting function with respect to the upper part 156 and the lower part 158 of the gripping device.

In FIG. 10, the same reference characters are used as in FIGS. 9*a* and 9*b* to designate corresponding parts. FIG. 10 shows how the upper part 156 of the gripping device is connected to the upper shielding member 150. In the upper shielding member 150, a groove 182 is provided which is T-shaped in cross section. The upper part 156 of the gripping device comprises a displaceable holder in the form of a vertical pin 184 whose upper end 186 has an enlarged diameter. The upper end 186 whose diameter is enlarged fits in the upper part of the groove 182 and thus prevents the holder from falling down, thereby also holding the upper part 156 of the gripping device in place adjacent to the upper shielding member 150. The connection 190 (see FIG. 9*b*) between the blank 164 and the gripping device is shielded when the upper shielding member 150 is pressed against the lower member 152, thereby making it more difficult for a diaphragm to extend between them to said connection 190.

The invention claimed is:

1. A method in a press of pressure cell type comprising a forming tool and, separated therefrom, a diaphragm, which define a forming space, comprising the steps of:

inserting a blank into the forming space;

pressing the diaphragm against the blank, thereby forming the blank against the forming tool;

gripping, by means of at least one gripping device, a blank portion projecting from the forming space; and shielding a connection between the blank and the gripping device from the diaphragm at least when the diaphragm is pressed against the blank.

2. A method as claimed in claim 1, comprising the steps of:

arranging the blank between at least two gripping devices; and stretching the blank by means of the gripping devices, before the diaphragm is pressed against it, so that the blank is plastically deformed.

3. A method as claimed in claim 2, in which said shielding is achieved by moving two shielding members, one on either side of the blank, towards each other.

4. A method as claimed in claim 3, further comprising the step of:

gripping the blank by moving, when the shielding members are moved towards each other, an upper part and a lower part of the gripping device towards each other in such manner that they fix the blank.

5. A method as claimed in claim 4, further comprising the step of:

applying a force to at least one of the shielding members, on both sides of the horizontal extent of the blank transversely to the stretching direction, said force being directed towards the other shielding member, so that an evenly distributed pressure is exerted on the gripping device for fixing the blank.

6. A method as claimed in claim 5, comprising the step of:

keeping the two shielding members in front of the connection of the blank sufficiently separated to allow the blank to be stretched.

7. A method as claimed in claim 3, further comprising the step of:

applying a compressive force to the shielding members in said direction, after stretching the blank, so that a sufficiently tight abutment against the blank is achieved in front of the connection between the blank and the gripping device to prevent the diaphragm from extending between the shielding members and the blank to said connection.

8. A method as claimed in claim 3, comprising the step of:

stretching the blank by displacing the gripping device radially away from the forming space, in a space formed by the shielding members.

9. A method as claimed in claim 1, comprising the steps of:

arranging the forming tool in a tray device; and effecting gripping of the blank by bringing an upper and a lower tray part together.

10. A method as claimed in claim 9, in which the tray device comprises a tray plate and a tray frame which is annularly divisible into at least one upper and one lower frame part, comprising the steps of:

bringing the upper and the lower tray part together to form the tray frame; and arranging the blank in such manner that it is gripped by the upper and the lower tray part when brought together.

11. A method as claimed in claim 10, comprising the step of:

separating the tray frame into the upper and the lower tray part, so that a processed blank is accessible for removal thereof, and so that, after removal of the processed blank, a new blank can be arranged in the tray device to be fixed therein.

12. A method as claimed in claim 9, further comprising the step of:

removing the tray device from the press before the tray device is separated into said parts.

13. A method as claimed in claim 12, further comprising the step of:

inserting the tray device in the press chamber after the separated parts have been brought together.

14. A method as claimed in claim 1, comprising the step of:

turning the gripping device about an axis, so that said connection is oriented towards a shielding wall, so as to achieve said shielding.

15. A method as claimed in claim 6, comprising the step of:

exerting a pressure by the diaphragm, during its expansion towards the blank, on at least one of the shielding members, such that the separation is reduced and a sufficiently tight abutment against the blank is achieved to prevent the diaphragm from extending between the shielding members and the blank to said connection.

16. A press of pressure cell type, comprising:

a forming tool and, separated therefrom, a diaphragm, which define a forming space in which a blank is intended to be formed against the forming tool by pressing the diaphragm against the blank;

at least one gripping device arranged to grip a blank portion projecting from the forming space; and shielding means arranged to shield the connection between the blank and the gripping device from the diaphragm at least when the diaphragm is pressed against the blank.

17. A press of pressure cell type as claimed in claim 16, which comprises at least two gripping devices, the connection between the blank and at least one gripping device being movable to allow the blank to be stretched in such manner that it is plastically deformed.

18. A press of pressure cell type as claimed in claim 17, wherein each gripping device comprises an upper part and a lower part, which when brought together are adapted to fix the blank.

19. A press of pressure cell type as claimed in claim 18, wherein said shielding means comprises an upper shielding member and a lower shielding member, the blank being insertable there between.

20. A press of pressure cell type as claimed in claim 19, wherein, in the assembled position, the shielding members enclose the gripping device both from above and from below and define a sliding space, the upper and lower shielding members having sliding surfaces on which the upper and the lower part of the gripping device is slidable, respectively.

21. A press of pressure cell type as claimed in claim 20, which further comprises force-exerting means, which are arranged to exert a force on at least one of the shielding members, on both sides of the horizontal extent of the blank transversely to the stretching direction, said force being directed toward the other shielding member, so that an evenly distributed pressure is exerted on the gripping device for fixing the blank.

22. A press of pressure cell type as claimed in claim 21, wherein the upper shielding member is bent in such manner that its central portion is located vertically lower than peripheral portions on which said force-exerting means exerts said forces, said forces straightening the upper shielding member and bringing about said even distribution of the pressure.

23. A press of pressure cell type as claimed in claim 21, wherein the two shielding members in front of the connection of the blank are sufficiently separated to allow the blank to be stretched.

24. A press of pressure cell type as claimed in claim 19, wherein the two shielding members, when brought together in front of the connection between the blank and the gripping device, are each adapted to abut sealingly, by means of a force exerted thereon, against a respective side of the blank to prevent the diaphragm from extending between the shielding members and the blank to said connection.

25. A press of pressure cell type as claimed in claim 20, wherein the upper part of the gripping device is connected to the upper shielding member to allow them to be lifted and/or lowered together.

26. A press of pressure cell type as claimed in claim 19, which further comprises a tray device, which defines a space adapted to receive the forming tool and a blank arranged on top of the latter, the tray device being divisible into at least one upper part and one lower part, the upper shielding member being connected to the upper part of the tray device to allow them to be lifted and/or lowered together.

27. A press of pressure cell type as claimed in claim 26, wherein the tray device comprises a tray plate and a tray frame, which tray frame is annularly divisible into at least one upper frame part and one lower frame part, the upper shielding member being connected to the upper frame part to allow them to be lifted and/or lowered together.

28. A press of pressure cell type as claimed in claim 26, wherein the shielding members form part of end pieces, which are arranged at two opposite sides of the inner wall of the tray device, said end pieces serving as a support for the forming tool.

29. A press of pressure cell type as claimed in claim 18, wherein a hydraulic arrangement is provided comprising a hydraulic piston and a coupling means connected thereto and to at least one of the parts of the gripping device, the hydraulic piston being arranged to actuate the coupling means and, thus, the gripping device for stretching the fixed blank.

30. A press of pressure cell type as claimed in claim 16, wherein the gripping device is provided with a slot, which extends from the periphery of the gripping device and in which the blank portion projecting from the forming space is insertable.

31. A press of pressure cell type as claimed in claim 30, wherein the gripping device is circular in cross-section and turn about its center axis, so that said slot, with the blank portion inserted therein, is shielded by an at least partially enclosing wall, whose cross-section matches the gripping device.

32. A press of pressure cell type as claimed in claim 23, wherein the diaphragm is arranged to exert a pressure, during its expansion towards the blank, on at least one of the shielding members such that the separation is reduced and a sufficiently tight abutment against the blank is achieved to prevent the diaphragm from extending between the shielding members and the blank to said connection.

33. A press of pressure cell type as claimed in claim 28, wherein at least one of the end pieces is movable away from the inner wall towards the center of the tray device to serve as a support for a forming tool of smaller extent.

34. A tray device for use in a press of pressure cell type, which tray device defines a space adapted to receive a forming tool against which a blank is formable, comprising;

at least one gripping device, which is adapted to grip an end portion of the blank; and shielding members, which are guidable between an open position and a shielding position and which are adapted to at least partially enclose the gripping device in the shielding position.

35. A tray device as claimed in claim 34, wherein the tray device is divisible into at least one upper tray part and one lower tray part, the upper tray part being connected to an upper shielding member, which in turn is connected to an upper part of the gripping device, to allow them to be lifted and/or lowered together with the upper tray part and, thus, simultaneously separated from respectively a lower shielding member and a lower part of the gripping device, the lower part and the upper part of the gripping device being adapted to hold the blank between them.

36. A tray device as claimed in claim 35, comprising:

at least two gripping devices and shielding members associated therewith, wherein at least one gripping device is movable in a space formed by the upper and the lower shielding member, to allow the blank to be stretched, when gripped, so that it is plastically deformed.

37. A tray device as claimed in claim 36, wherein force-exerting means are arranged to exert a force on the upper shielding member, on both sides of the horizontal extent of the blank transversely of the stretching direction, said force being directed towards the lower shielding member, so that an evenly distributed pressure is exerted on the gripping device for fixing the blank.

38. A tray device as claimed in claim 35, wherein the tray device comprises a tray plate and a tray frame, which is annularly divisible into at least one upper and one lower frame part, the upper shielding member being connected to the upper frame part to allow them to be lifted and/or lowered together.

* * * * *